United States Patent [19]

Sadler

[11] Patent Number: 4,498,630
[45] Date of Patent: Feb. 12, 1985

[54] DRIVE MECHANISM FOR A MANURE SPREADER

[75] Inventor: Loren G. Sadler, Stevens, Pa.

[73] Assignee: Sperry Corporation, New Holland, Pa.

[21] Appl. No.: 413,106

[22] Filed: Aug. 30, 1982

[51] Int. Cl.³ ............................................. A01C 17/00
[52] U.S. Cl. ................................. 239/677; 239/679; 239/684; 474/74
[58] Field of Search ............... 239/670, 677, 679, 684; 474/74, 75; 192/67 R, 108

[56] References Cited

U.S. PATENT DOCUMENTS

| | | | |
|---|---|---|---|
| 492,872 | 3/1893 | Maybach | 474/75 |
| 765,141 | 7/1904 | Killam | 474/75 |
| 2,953,386 | 9/1960 | McCarty | 239/677 |
| 3,177,739 | 4/1965 | Shelton | 474/75 |
| 3,575,252 | 4/1971 | Konyha | 474/75 |
| 3,722,306 | 3/1973 | Campbell et al. | 239/677 |
| 3,837,231 | 9/1974 | Holmlund | 474/75 |
| 4,196,859 | 4/1980 | Trott et al. | 239/684 |

Primary Examiner—Andres Kashnikow
Assistant Examiner—Michael J. Forman
Attorney, Agent, or Firm—Carl H. Just; Frank A. Seemar; Darrell F. Marquette

[57] ABSTRACT

A manure spreader including a rotary distributor at the rear end and an endless apron having a span movable along the bottom of the body is powered from a p.t.o. or the like from a tractor to drive the distributor at a predetermined rate while the speed of the apron may be varied between slow, fast and very fast by variable drive mechanism adjacent the rear end of the body and includes a jaw clutch associated with the distributor, a slidable clutch member movable selectively between driven sprocket gears respectively for relatively slow and fast drive of the apron, together with a direct drive connection between a main drive shaft and a secondary drive shaft connected to the apron to provide a very fast speed for the apron while the distributor is idle to effect a fast cleanout of the body at the end of distributing a load of manure. The direct drive referred to is supplemented by an overriding clutch.

12 Claims, 8 Drawing Figures

DRIVE MECHANISM FOR A MANURE SPREADER

BACKGROUND OF THE INVENTION

In agricultural operations and especially on dairy farms, a herd of milk cows will produce very substantial amounts of manure during the winter season when, for most of the time, they are indoors, and this manure is a valuable product to be spread upon the farm, especially in the spring or even during the winter months by means of a manure spreader which, in general, is mobile and pulled by a tractor from which power to drive the spreader is derived by a rear p.t.o. of well known type for purposes of driving an endless apron which extends along the bed of the body of the manure spreader, as well as a transversely disposed rotary distributor at the discharge end of the body which engages and flings the mass of manure gradually fed thereto by rearward movement of the upper span of the endless apron.

Depending upon how the mass of manure is located in the body of the spreader, it is preferable to provide a variable drive for the apron so that, for example, if the mass is greater at one location in the body of the spreader, it is preferable to drive the apron at a slower rate and then possibly increase the speed as masses of lesser amount are encountered during the entire unloading of the spreader. This is because, in general, a rotary distributor usually is driven at a relatively constant speed. Also, and more importantly from the standpoint of the present invention, when a load of manure nears the end of being discharged, it is customary to stop the operation of the distributor but move the apron in discharge direction sufficiently to more or less completely unload the entire mass of the manure while this relatively small last portion of the load is not interfered with by the distributor which, because of its normal rotary direction is capable of picking up some of the manure and flinging it back into the body of the spreader.

While the normal relatively slow and fast operation of the apron is fully adequate to effectively unload the spreader in conjunction with the distributor, it now has become desirable to effect the last cleanout operation at a still faster speed than normal fast speed of the apron so as to expedite the entire discharge from the spreader, especially while the distributor is idle. Means to arrange for the faster drive of the apron during the final cleanout operation is the object of the present invention and the means for accomplishing this are set forth in detail hereinafter.

The desire to effect a fast cleanout of a manure spreader has been the object of prior developments and constitute improvements, for example, over the type of operation of a manure spreader such as is the subject matter of prior U.S. Pat. No. 3,722,307 to Campbell, dated Mar. 27, 1973, in which clutches are operated to provide, for example, relatively slow and fast operation of the apron without having any provision for a more rapid cleanout drive as is now desired. However, the Campbell patent does include mechanism for idling the distributor when desired, such as during the final cleanout operation when, for example, the apron may be driven at the normal fast speed.

The aforementioned improvements over the structure of the Campbell patent are illustrated, for example, in prior U.S. Pat. No. 2,953,386 to McCarty, dated Sept. 20, 1960, in which ratchet mechanism is provided for producing a faster drive speed of the apron during the cleanout operation than the normal fast operation of the apron. The invention covered by said patent is owned by the assignee of the instant invention and it has been found that the structure illustrated in the patent has certain fallacies which are undesirable and the present invention constitutes an improvement thereover.

Still another type of manure spreader in which a fast cleanout speed is effected comprises the subject matter of prior U.S. Pat. No. 4,196,859 to Trott et al, dated Apr. 8, 1980 in which the drive mechanism is at the forward end of the body of the manure spreader and a pair of long drive shafts are required to extend along one side of the body respectively for actuation of the apron and the distributor. This mechanism necessitates the use of a variable speed pulley assembly in which a cam-operated shifter assembly is required with respect to a jaw clutch and said variable speed pulley assembly. The present invention is submitted to be an improvement over the aforementioned prior examples of rapid cleanout mechanism, details of which are set forth below.

SUMMARY OF THE INVENTION

It is among the principal objects of the present invention to provide an improvement in the operation of a manure spreader which, to some extent, is somewhat similar to the drive mechanism of the aforementioned Campbell U.S. Pat. No. 3,722,307 which also is owned by the assignee of the instant invention, but the similarity resides primarily in the fact that the drive mechanism is located at one side of the rear portion of the body of the manure spreader and, especially for purposes of providing an extra fast cleanout drive for the apron, other improvements over the Campbell structure are included.

One primary object of the present invention is to provide a single drive shaft extending along one side of the body of the spreader for purposes of obtaining power from a p.t.o. drive at the forward end of the shaft, while the rearward end is connectable to a gear housing directly associated with the transverse shaft of the distributor through a jaw clutch, said shaft also driving a pair of similar sprockets of relatively small diameter which respectively drive sprocket gears of different diameters idly mounted upon a relatively short secondary drive shaft parallel to the main or first drive shaft, and a slidable clutch member is movable between said sprocket gears selectively engageable with clutch-engageable means on said sprocket gears for providing relatively slow and fast operation of the apron which is driven by a gear box connected to a shaft on one of the rollers for the endless apron positioned adjacent the discharge end of the spreader, and the still faster cleanout operation of the apron is effected by a direct drive established between the two shafts by means of pulleys preferably of the same diameter and around which a driving belt somewhat loosely extends and is capable of being rendered operative by a belt tightener which is made effective only when the extra fast cleanout drive for the apron is desired.

A further object of the invention is to include an overriding clutch in association with the sprocket gear of smaller diameter which effects the normal fast drive for the apron and thereby permits the still faster operation of the apron while the smaller diameter sprocket gear is engaged with the slidable clutch member and the overriding clutch associated therewith prevents any damage to the mechanism.

Still another object of the invention is to operate the slidable clutch member for operation between the two sprocket gears of different diameters by mounting the same upon a portion of a longitudinally movable frame actuated preferably by a cable extending therefrom to the forward end of the body of the spreader where a fluid-actuated cylinder actuates the cable through a control means on the tractor or the like for operation by the person driving the tractor.

Still another object of the invention is to utilize the longitudinally movable frame referred to above to actuate a short shaft connected to the jaw clutch which controls operation of the distributor in such manner that the clutch remains engaged when the slidable clutch member functions to provide relatively slow and normal fast speeds for the apron but, when said frame is moved to effect operation of the aforementioned direct drive between the shafts for producing the still faster discharge operation of the apron, the jaw clutch which controls the operation of the distributor will disengage the drive for the distributor automatically.

A still further object of the invention is to actuate the belt tightener of the direct drive mechanism by means of the aforementioned cable which actuates the longitudinally movable aforementioned frame by which the slidable clutch member moves between the two sprocket gears of different diameter.

Details of the foregoing objects and of the invention, as well as other objects thereof, are set forth in the following specification and illustrated in the accompanying drawings comprising a part thereof.

DETAILED DESCRIPTION OF THE PREFERRED EMBODIMENT OF THE INVENTION

Figure 1:
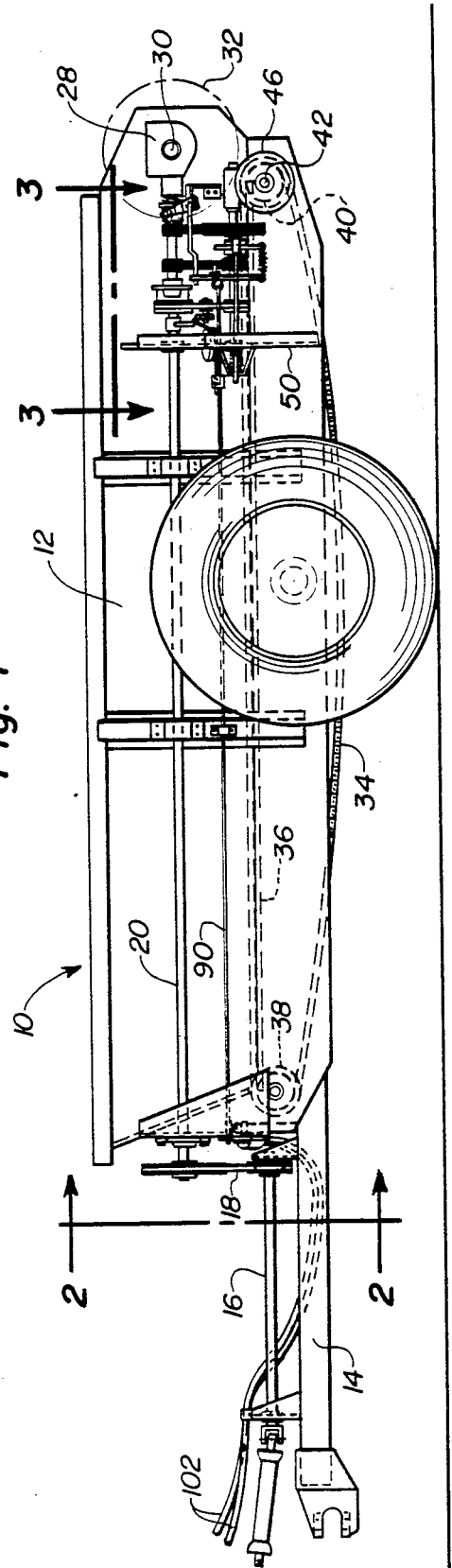
FIG. 1 is a side elevation of a manure spreader embodying the principles of the present invention and showing at the rear end thereof the drive mechanism for the distributor and apron thereof.
Figure 2:
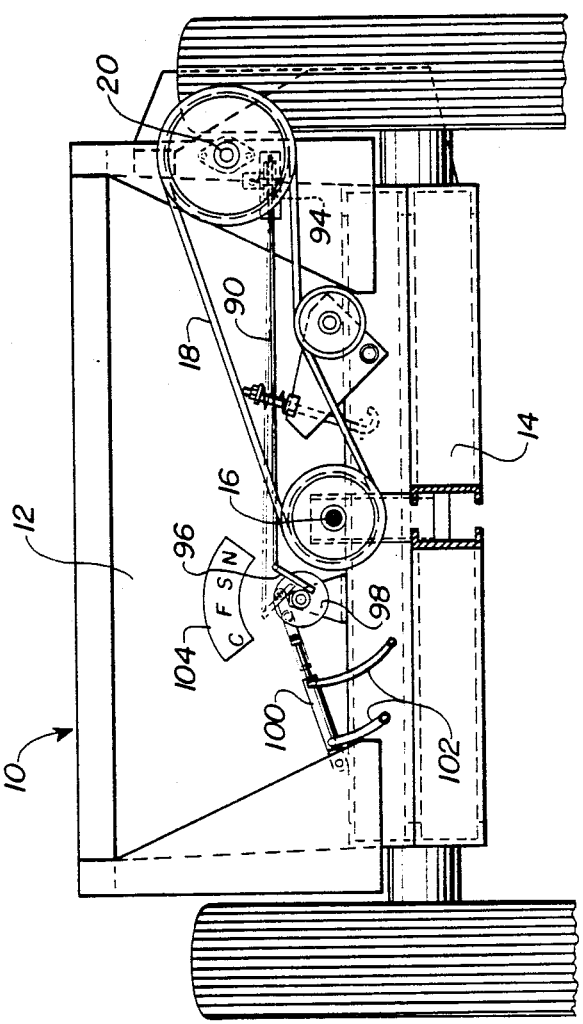
FIG. 2 is a fragmentary vertical elevation of the forward end of the manure spreader shown in FIG. 1 and employing a larger scale than used in FIG. 1.
Figure 3:
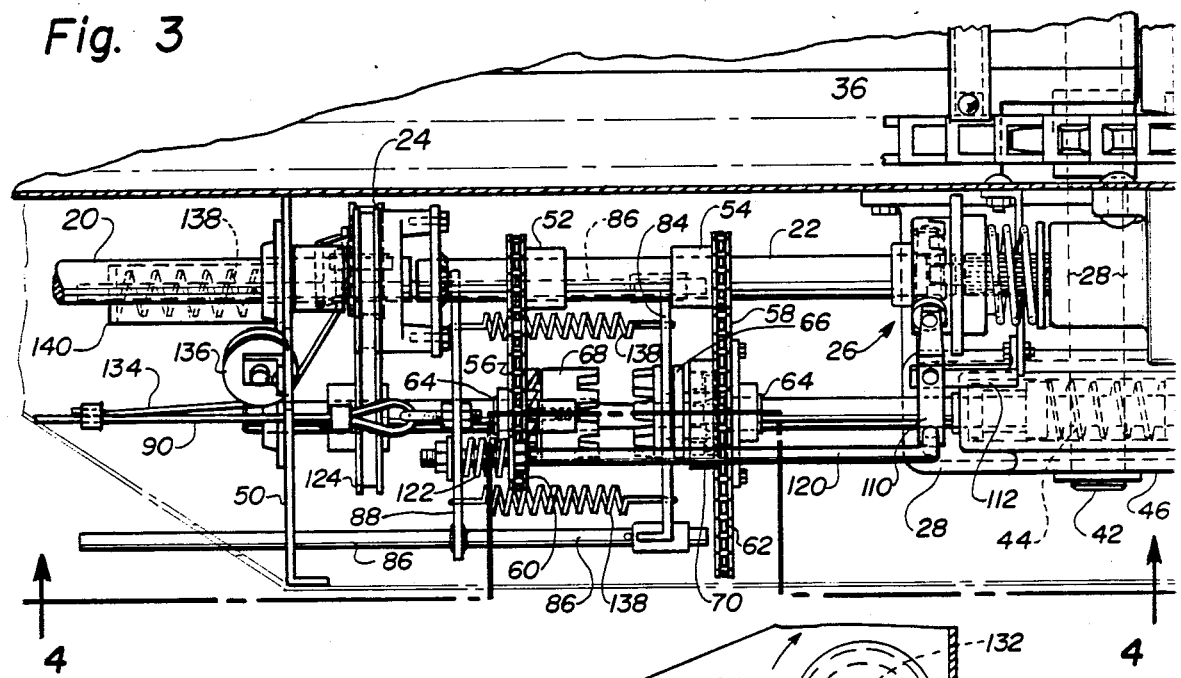
FIG. 3 is a fragmentary plan view, on a still larger scale, showing details of the drive mechanism shown adjacent the right hand end of FIG. 1.

Referring to FIG. 1, there is illustrated therein an exemplary manure spreader 10 of the mobile type comprising a body 12 and a forwardly extending tongue 14 connectable to a power means such as a tractor having a p.t.o. to which a forward drive shaft 16 is connected. As shown in FIG. 2, the shaft 16 is connected by means of pulleys and a surrounding belt 18 to the main longitudinal drive shaft 20 which extends substantially for the full length of the body 12 of the spreader. As best shown in FIG. 3, drive shaft 20 has an extension 22 connected thereto by a pulley member 24, for purposes to be described. The rearward end of extension shaft 22 is connected by means of a jaw clutch 26 to a gear box 28 which preferably includes a pinion and bevel gear, the bevel gear being connected to a transverse shaft 30 upon which a manure distributor 32 is mounted for rotation in a suitable direction to engage manure in the body 12 and distribute it upon a field by flinging the same in addition to disintegrating the mass of manure incident to such distribution.

Referring to FIG. 1, there is illustrated mostly in phantom an endless apron 34 having an upper span 36 which normally is moved rearwardly to gradually cause the mass of manure piled thereon to be engaged by the distributor 32 at the rear, discharge end of the body 12. Apron 34 is supported between a pair of rollers 38 and 40, the rearward roller 40 having shaft 42 extending at one end therefrom for connection to a worm gear 44 within a gear box 46.

Longitudinal drive shaft 20 generally is referred to hereinafter as a first drive shaft for purposes of distinguishing the same from a secondary drive shaft 48 which is supported at one end by the gear box 44 and the opposite end extends through a bearing in transverse frame means 50 shown in FIGS. 3 and 4 and is fixed to one side of the body 12 as shown in FIG. 1. Secondary drive shaft 48 is parallel to first drive shaft 20 and is relatively short as can be visualized especially from FIGS. 3 and 4. The rear end of shaft 48 is connected directly to the worm 44 and the shafts 20 and 48 are both supported for rotation in the same direction but have no longitudinal movement. Accordingly, secondary drive shaft 48 is for purposes of driving the span 36 of apron 34 rearwardly at desired speeds which preferably are designated slow, fast, and still faster, the latter being employed for fast cleanout purposes.

The respective slow and fast speeds are effected by the following mechanism. Shaft extension 22 has fixed thereto in spaced relationship a pair of preferably similar sprockets 52 and 54 around which sprocket chains 56 and 58 extend, said chains also extending around sprocket gear 60 of relatively small diameter and freely rotatable upon secondary drive shaft 48, while sprocket chain 58 extends around sprocket gear 62 of substantially larger diameter than sprocket gear 60. By this arrangement, sprocket gear 62 effects the slow drive of apron 34, while the smaller diameter sprocket gear 60 effects relatively fast drive of apron 34. Sprocket gear 62 also is mounted for free rotation upon shaft 48 and it will be seen that by means of snap rings 64, or other suitable means mounted upon shaft 48, sprocket gears 60 and 62 are prevented from axial movement and thus are maintained in transverse alignment with the sprockets 52 and 54.

Selective drive of secondary shaft 48 for purposes of producing relatively slow and fast speed is accomplished by means of a second clutch member 66 which actually is a slidable clutch member movable axially upon the shaft 48 but splined or otherwise mounted upon the shaft in a manner to prevent relative rotation upon shaft 48 so as to comprise a driving member with respect to clutch-engageable members 68 and 70 respectively associated with sprocket gears 60 and 62.

For purposes to be described, the clutch-engageable member 68 actually is part of an overriding clutch 72 comprising ratchet teeth on one face of the smaller sprocket gear 60 engageable by a spring-pressed pin 74 mounted within a bore in clutch engageable member 68 associated with smaller diameter sprocket gear 60.

Figure 6:
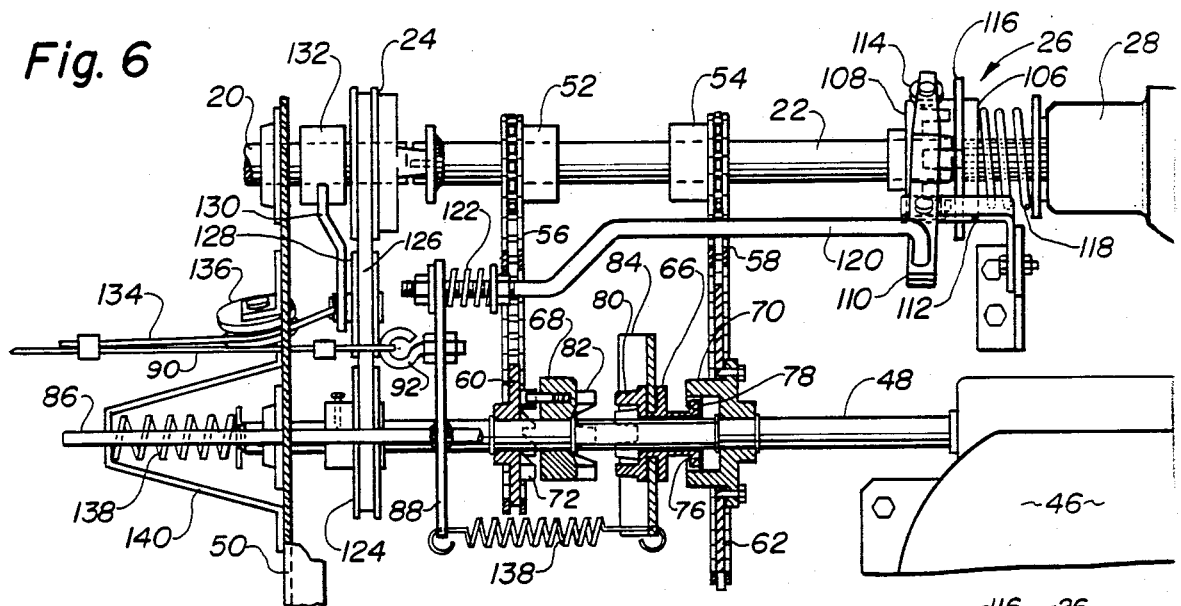
FIG. 6 is a view similar to FIG. 4 but showing the slidable clutch member in engagement with the sprocket gear of larger diameter to effect relatively slow drive of the apron.
Figure 7:
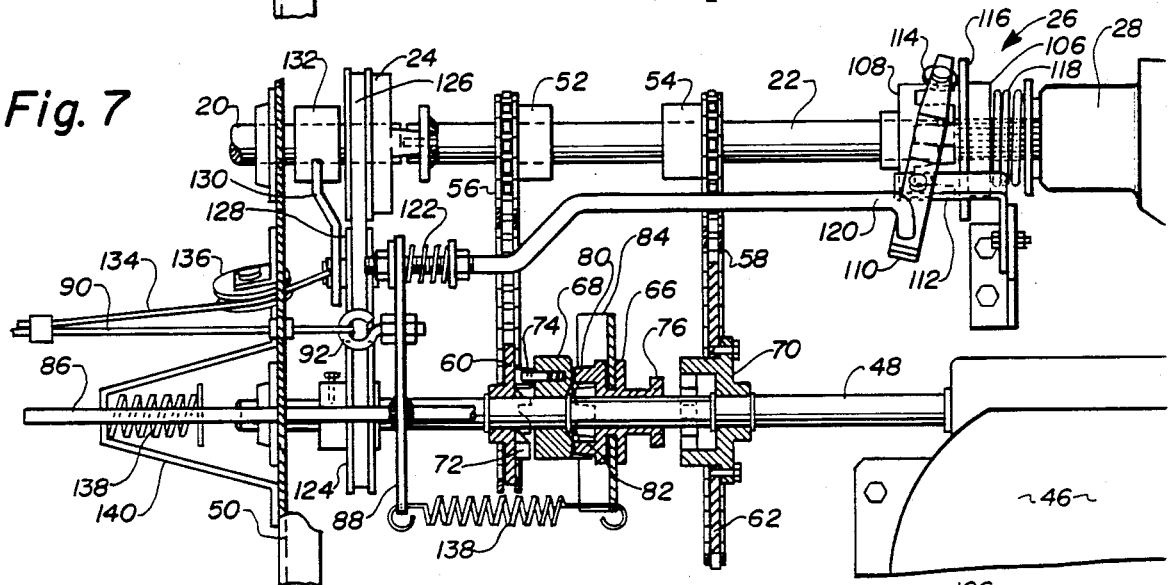
FIG. 7 is a view similar to FIG. 6 but showing the slidable clutch member in engagement with the relatively small diameter sprocket gear to provide normal fast drive for the apron.
Figure 8:
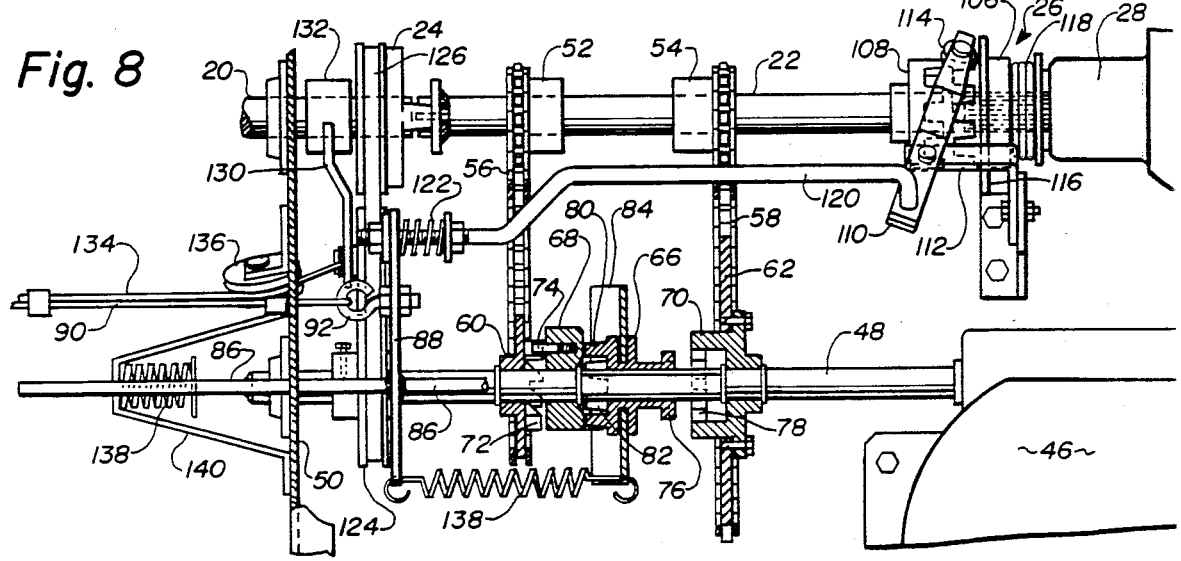
FIG. 8 is a view similar to FIGS. 4, 6 and 7 but illustrating direct drive in operation for the apron to produce still faster speed thereof while the jaw clutch for the operation of the distributor is disengaged to prevent movement of the distributor while the faster cleanout operation by the apron takes place.

Referring particularly to FIGS. 6–8, it will be seen that one end of second clutch member 66 has spur teeth 76 engageable with internal teeth 78 formed in one end of clutch engageable member 70. In FIG. 6, the same are shown in engagement for purposes of driving shaft 48 at a speed to produce aforementioned slow movement of the apron 34. The other end of the second clutch member 66 opposite the one containing the spur teeth 76 has jaws 80 engageable with jaws 82 on clutch engageable member 68 and when said jaws are moved into engagement as shown in FIGS. 7 and 8, the smaller diameter spur gear 60 is driven to drive shaft 48 at a speed to move apron 34 at a normal fast speed. It will be understood that the relatively slow speed of the apron is employed when heavier masses of the manure are to be engaged by distributor 32, such as where the manure is piled higher in the body 12 at certain locations and not as high in other locations. In the latter situation, the normal fast speed of the apron is employed.

Axial movement of the second clutch member 66 is effected by mounting the same in a bearing in a transverse member 84 comprising part of a frame which also includes a pair of shafts 86 which are parallel to each other and extend longitudinally, said pair being best shown in FIG. 3 in which the upper one is shown in phantom since it is hidden behind portions of drive shaft 20 and extension shaft 22. Opposite end portions of the transverse frame member 84 are connected to said shafts and a similar, parallel plate-like frame member 88 also is connected to said shafts. Said shafts also extend through suitable bearing holes in transverse bearing means 50.

Actuation of the longitudinally movable frame comprising transverse members 84 and 88 and shafts 86 is effected by means of a cable 90, one end of which is affixed to eyelet 92 which is connected to frame member 88 and said cable extends to the forward end of body 12, around a pulley 94 and the opposite end thereof is connected to a short arm 96 on the rotatable member 98, see FIG. 2, which is operable through a limited arc by means of a fluid-operated cylinder 100 which receives fluid respectively at opposite ends of the cylinder through conduits 102 which extend to and from a source of fluid under pressure and regulated by a control valve, not shown, which is preferably supported in a handy location for engagement by the operator of the tractor. The normal neutral position of the second clutch member 66 is as shown in FIG. 4, wherein the spur teeth 76 of clutch member 66 are disposed out of engagement with the internal teeth 78 of clutch engageable member 70 and in this condition, no operation of the apron 34 occurs. This is a situation desired especially when the spreader is being moved to a field where the manure is to be distributed, for example, and under such circumstances the distributor 32 also is idle due, for example, to the p.t.o. being idle. However, upon reaching the location for distribution, the p.t.o. can be placed in operation to rotate shaft 20 and extension shaft 22 for purposes of activating the distributor 32, especially for purposes of engaging some of the mass of material if the same happens to be piled against the distributor. In certain embodiments of manure spreaders however, there is a removable barrier adjacent the distributor to prevent the material from being piled against it until distribution is desired. Assuming that operation of the distributor 32 is initiated such as by activating the p.t.o., operation of the apron 34 then is desired and this is accomplished by moving the short arm 96 to one of the designations in the visual display 104 on the front wall of the body 12 for example as shown in FIG. 2, the designations respectively referring to, from right to left; neutral, wherein the distributor is driven but the apron is idle; slow speed of the apron; normal fast speed of the apron, and the designation "C" indicating that the distributor is idle and the apron is moving at a still faster speed than the normal fast speed, for quick cleanout at the end of unloading the spreader. Accordingly, upon cable 90 being moved to the left as viewed in FIGS. 4 and 6–8, teeth 76 of the second clutch member 66 engage the internal teeth 78 and effect driving movement of the larger diameter sprocket gear 62 to provide slow movement of the apron. When faster movement is desired, the cable 90 is moved forward still farther to cause the second clutch member 66 to effect the teeth 80 thereof engaging the teeth 82 of clutch engageable member 68 which comprises part of overriding clutch 72 and thereby causes driving of smaller diameter sprocket gear 60 to effect normal fast movement of the apron since the disengagement of the second clutch member 66 from sprocket gear 62 has been caused by such further movement of second clutch member 66 to engage the sprocket gear 60. Thus, the foregoing explains how the slow and normal fast speeds of the apron are accomplished.

During the time that the relatively slow and fast speeds of the apron occur, the distributor 32 normally is operating continuously at a predetermined fixed speed which is accomplished by the jaw clutch 26 being in engagement to connect the shaft extension 22 with the gear box 28 that actuates distributor 32. To distinguish the clutch 26 from second clutch member 66, clutch 26 is, as indicated, a jaw clutch and comprises one clutch member 106 which is fixed to a stub shaft extending from the driven shaft of gear box 28, said stub shaft being axially aligned with shaft extension 22 but separate therefrom. Second clutch member 106 is keyed to but is mounted for a limited sliding movement on shaft extension 22. Clutch members 106 and 108 have similar, coengageable teeth of appreciable length. A clutch actuator comprises a pivoted lever 110 supported on bracket 112, one end of lever 110 having a roller 114 thereon which is engageable with an annular flange 116 on clutch member 106. Normally, clutch members 106 and 108 are maintained in engagement by means of a spring 118. Such engagement is present during the aforementioned slow and normal fast driving of the apron 34 and corresponds to the illustration shown in FIGS. 6 and 7. In FIG. 6, during slow operation, and in FIG. 7 during normal fast operation, the teeth of the clutch members 106 and 108 are in full engagement. In FIG. 8, which is a situation existing when the still faster speed of the apron is desired during final cleanout operation, when the distributor 32 is idle, it will be seen that the teeth of clutch members 106 and 108 are disengaged for such purpose.

Figure 4:
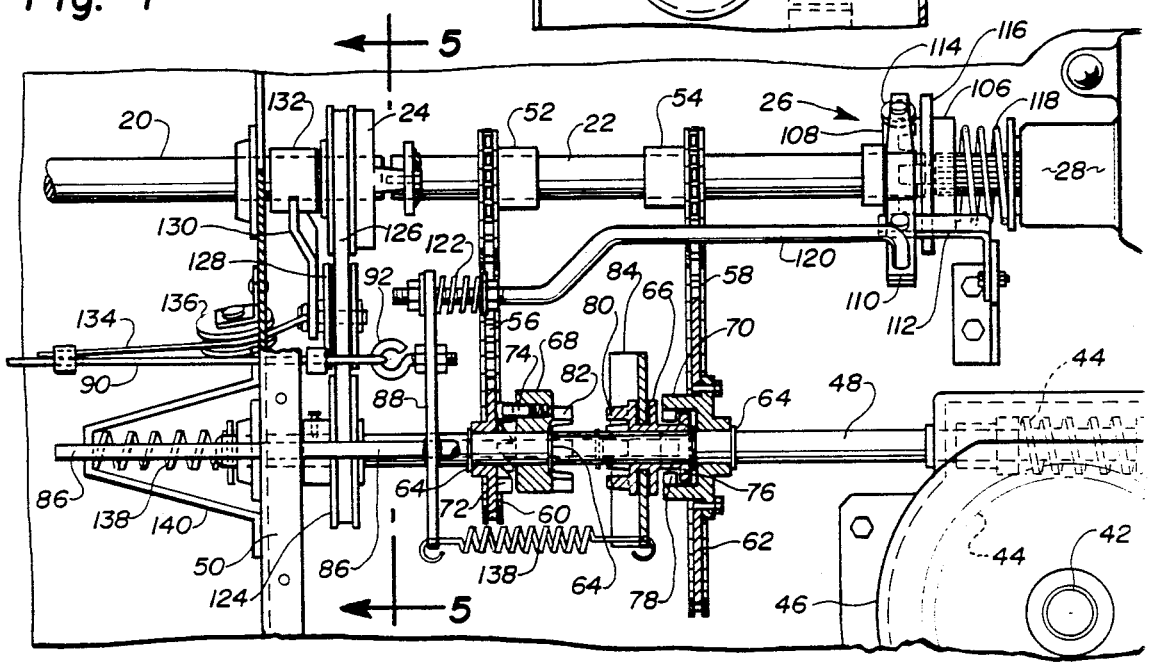
FIG. 4 is a side elevation of the mechanism shown in FIG. 3 with certain portions being broken away, as shown on the line 4—4 of FIG. 3.

Actuation of the lever 110 is effected by means of a short rod 120 of irregular shape, the rear end of which is connected to the end of lever 110 opposite that which supports the roller 114 and the opposite end of the rod 120 is connected to frame member 88 in a manner to permit limited movement in an axial direction which is necessary to dispose the second clutch member 66 in idle position as shown in FIG. 4, in which position the clutch members 106 and 108 of first jaw clutch 26 are fully engaged, as they also are in FIG. 6 in which slow speed of the apron is effected but additional limited axial movement of the frame member comprising frame member 88 is necessary rearwardly a limited extent to disengage the spur teeth 76 from internal teeth 78 on second clutch member 66. Accordingly, a limited relative movement between the frame plate 88 and rod 120 is necessary and this is permitted by means of a short spring 122.

FAST CLEANOUT SPEED OF APRON

As indicated above, one of the principal objectives of the present invention is to effect fast cleanout speed which is preferably substantially greater than that of the normal fast speed which occurs during the progressive unloading movement of the main mass of material carried by the spreader. Such still faster drive speed of the apron is accomplished by moving the cable 90 to the fullest permitted extent, corresponding to indicia (C) on the display 104. Such movement of the cable occurs while the second clutch member 66 is in engagement with the clutch engageable member 68 and the apron is being driven at normal fast speed by the driving movement of smaller diameter sprocket gear 60. Pulley member 24 comprises part of the mechanism to produce the still faster or rapid cleanout movement of the apron. The pulley 24 is the driving pulley which is mounted in conjunction with driven pulley 124 and an endless V-belt 126, or timing belt if desired, extends around the pulleys, normally in a loose condition, whereby location of pulley 24 during the normal slow and fast operation of the apron will have no effect upon driven pulley 124. A belt-tightening roller 128, best shown in FIG. 5, is supported upon one end of an arm 130 which extends from and is supported by a sleeve 132 mounted for free rotation upon drive shaft 20.

Figure 5:
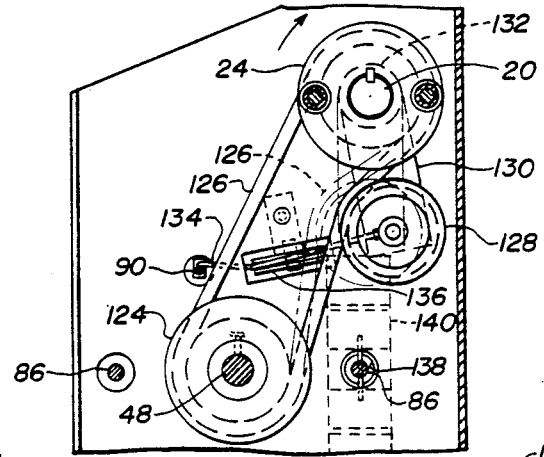
FIG. 5 is a fragmentary sectional view taken on the line 5—5 of FIG. 4 to illustrate operation of the direct drive means for the apron of the manure spreader.

A supplemental short cable 134 extends around a guide pulley 136 and one end thereof is connected to cable 90, while the other end thereof is connected to arm 130 in a manner to move the same clockwise as viewed in FIG. 5, and thereby tighten the belt 126 to effect positive driving of the pulley 124 which is fixed to shaft 48. The pulleys 24 and 124 are preferably substantially of the same diameter and by tightening the belt 126 therearound, to dispose it for example in the phantom position shown in FIG. 5, direct driving of the shaft 48 by the shaft 20 is effected and because of the relative diameters of the pulleys as described, appreciably faster speed of the apron is effected, said speed being faster than that which is caused by smaller diameter sprocket gear 60 which in the meantime is still in engagement with second clutch member 66. Thus, because the shaft 48 is being driven by pulley 124 at a faster speed than normally caused by smaller diameter sprocket gear 60, the overriding clutch 72 permits ratcheting of the sprocket gear 60 with respect to the clutch engageable member 68 associated therewith and no damage to the mechanism will occur during such substantially faster cleanout movement of the apron, while the distributor 32 is idle.

Such further movement forwardly of the frame comprising frame members 84 and 88 such as illustrated in FIG. 8 with respect to FIG. 7, for example, and especially while the second clutch member 66 is in engagement with gear 70, the transverse frame member 84 is held in the position shown in FIGS. 7 and 8 while the frame member 88 is moved forward a farther limited amount and such movement is permitted by means of springs 138 respectively at opposite sides of the frame members 84 and 88 as can best be seen in FIG. 3 which is a top plan view, it being understood that in the other figures, one spring hides the other.

Restoration of the frame comprising members 84 and 88 to the neutral position thereof shown in FIG. 4 is accomplished by means of a still further spring 138 supported within a bracket 140 attached to frame means 50 as clearly shown in FIGS. 4 and 6–8 which is shown in FIG. 4 to be in its fullest expanded position, whereas in FIG. 8, it is shown in its fullest compressed position, it being understood that the spring 138 operates upon one of the shafts 86 affixed for example to frame member 88.

From the foregoing, it will be seen that the present invention not only permits normal slow and fast speeds for the operation of a discharging apron of a manure spreader, but by relatively simple and highly effective and durable mechanism, still faster cleanout speed of the apron is permitted by the very simple operation of a control cable and all of the various speeds are automatically effected by such movement of the cable, including also the disengagement of the first clutch 26 during the effecting of the still faster cleanout speed of the apron in order to render the distributor idle.

The foregoing description illustrates preferred embodiments of the invention. However, concepts employed may, based upon such description, be employed in other embodiments without departing from the scope of the invention. Accordingly, the following claims are intended to protect the invention broadly, as well as in the specific forms shown herein.

I claim:

1. A manure spreader having a box-like mobile body with a rear discharge end, a driven transverse distributor shaft at the discharge end supporting distributor elements, an endless apron having a span extending along the bed of the body and movable toward the discharge end by a driven transverse shaft, drive means for said shafts comprising a first drive shaft extending along one side of said body between the opposite ends thereof, means at the forward end of said drive shaft connectable to a source of power, a first clutch connecting the rearward end of said first drive shaft with said transverse distributor shaft, a secondary drive shaft parallel to said first drive shaft and extending therealong from the rearward end of said body a limited distance toward the forward end of the body, gear means connecting said secondary drive shaft to said driven transverse shaft of said apron, spaced similar drive sprockets fixed to said first drive shaft, sprocket gears of different diameters freely rotatable on said secondary drive shaft opposite said drive sprockets and sprocket chains respectively extending therearound, a second clutch member slidable on and rotatable by said secondary drive shaft between said sprocket gears and the opposite ends of said second clutch member respectively being engageable selectively with said sprocket gears respectively to drive said secondary drive shaft at relatively slow and fast speeds and correspondingly move said apron at such speeds, first shift means operable to move said second clutch member between said sprocket gears for selective driving engagement therewith, and supplemental shift means for said first clutch member operable by said first shift means to disengage said distributor shaft to permit independent drive of said apron, the improvement comprising the inclusion of direct drive means between said first drive shaft and secondary drive shaft operable to drive said driven transverse shaft and apron at a speed still greater than said fast speed while said first clutch is disconnected to idle said distributor and effect rapid cleanout of said body by said apron moving at said still greater speed.

2. The manure spreader according to claim 1 having the further improvement of including with the sprocket gear which produces the fast speed for said apron an overriding clutch to permit the still faster operation of said apron by said direct drive means while said sprocket gear remains engaged by said second clutch member.

3. The manure spreader according to claim 2 further characterized by said direct drive comprising a pair of sheaves of substantially the same diameter respectively fixed to said first and secondary drive shafts, an endless belt extending around said sheaves normally in loose non-driving relation, and a belt tightener operable to force said belt into driving relationship between said sheaves.

4. The manure spreader according to claim 3 further including means to operate said belt tightener and connect said means to said aforementioned shifting means for said second clutch member for operation of said belt tightening means thereby.

5. The manure spreader according to claim 3 in which said belt-tightener comprises an arm pivotally supported at one end upon one of said drive shafts and having a roller upon the other end engageable with said belt, and cable means connected to said arm and extending through guide means from said arm to the forward end of said body for actuation of said arm therefrom.

6. The manure spreader according to claim 2 in which said aforementioned shifting means includes a travelling frame guidably supported for longitudinal movement parallel to said first drive shaft, bearing means on said frame rotatably supporting said second clutch member and preventing relative axial movement therebetween, and means extending from said frame to the forward end of said body for actuation of said second clutch member.

7. The manure spreader according to claim 6 further including supplemental shifting means comprising an actuating member connected to and extending between said first clutch and travelling frame, and said first clutch being a jaw clutch including one jaw member fixed to said first drive shaft and a second member movable toward and from said one jaw member, and said actuating member being connected to said second jaw member and operable to move the same relative to said one jaw member between full engagement and full disengagement therewith, said full disengagement occurring when said direct drive means is operating to produce said still faster speed of said apron.

8. The manure spreader according to claim 7 further including an overriding clutch connected to the sprocket gear which produces the still faster operation of the apron by said direct drive means while said sprocket gear remains engaged by said second clutch member, said travelling frame being movable in one direction to engage said second clutch member with said sprocket gear to produce a slow speed of said apron and said frame being movable in the opposite direction to connect said second clutch member with the sprocket gear that produces said faster speed, said frame being movable still farther in said opposite direction to effect both operation of said overriding clutch and said direct drive means to produce said still faster movement of said apron, and spring means between said travelling frame and second clutch member operable to permit said still farther movement of said frame while said second clutch remains undisturbed in engagement with said sprocket which produces said faster speed.

9. The manure spreader according to claim 8 further including additional spring means engageable with said travelling frame and operable to move the same in a direction to disengage said second clutch member from both of said sprocket gears to establish a neutral inoperative idle condition of said spreader such as while being transported to a work site.

10. The manure spreader according to claim 1 further including a cable movable along said body from said first and supplemental shift means and operable to move the same as aforesaid, and fluid operated means on the forward end of said body connected to said cable to operate it by control means manually selectable by the operator of the spreader.

11. A manure spreader having a box-like mobile body with a bed and a rear discharge end, a distributor including a driven distributor shaft mounted adjacent the rear discharge end of the body, an apron having a span extending along the bed of the body and movable toward the rear discharge end thereof by a driven apron shaft, a first drive shaft connectable at one end to a source of power, a first clutch for connecting the other end of said first drive shaft with said driven distributor shaft, a secondary drive shaft connected to said driven apron shaft, a second clutch for selectively driving said secondary drive shaft at slow and fast speeds to correspondingly move said apron at such speeds, the improvement comprising direct drive means between said first drive shaft and said secondary drive shaft operable to drive said secondary drive shaft at a greater speed than said fast speed while said first clutch is disengaged to idle said driven distributor shaft and while said second clutch is engaged for driving said secondary drive shaft at said fast speed.

12. The manure spreader according to claim 11 further comprising an overriding clutch between said second clutch and said secondary drive shaft to permit said secondary drive shaft to be driven at said greater speed while said second clutch is engaged for driving said secondary drive shaft at said fast speed.

* * * * *